United States Patent
Sato et al.

(10) Patent No.: US 6,469,971 B1
(45) Date of Patent: Oct. 22, 2002

(54) DEVICE FOR REPRODUCING OPTICAL DISCS

(75) Inventors: Michihiro Sato, Yamagata-ken (JP); Nobuyuki Sato, Yamagata-ken (JP); Tetsuya Niino, Yamagata-ken (JP); Hideyuki Takahashi, Yamagata-ken (JP); Noritaka Kunimaru, Saitama-ken (JP); Shigeharu Furusawa, Saitama-ken (JP); Yasuhiro Shinkai, Saitama-ken (JP)

(73) Assignees: Pioneer Corporation, Tokyo (JP); Toboku Pioneer Corporation, Yamagata-ken (JP)

( * ) Notice: Subject to any disclaimer, the term of this patent is extended or adjusted under 35 U.S.C. 154(b) by 141 days.

(21) Appl. No.: 09/603,196

(22) Filed: Jun. 26, 2000

Related U.S. Application Data

(63) Continuation-in-part of application No. 09/472,836, filed on Dec. 28, 1999, now abandoned.

(30) Foreign Application Priority Data

Dec. 28, 1998 (JP) .......................................... 10-373130

(51) Int. Cl.[7] .............................................. G11B 17/04
(52) U.S. Cl. .................................................. 369/77.1
(58) Field of Search ................................ 369/77.1, 262, 369/258, 263, 270, 75.1

(56) References Cited

U.S. PATENT DOCUMENTS

| 4,969,140 A | * | 11/1990 | Koiwa et al. ............... 369/75.2 |
| 5,097,460 A | * | 3/1992 | Camps et al. ............... 369/194 |
| 5,150,349 A | * | 9/1992 | Takai et al. .................. 360/69 |
| 5,195,077 A | * | 3/1993 | Ishikawa et al. ............ 369/176 |
| 5,204,849 A | * | 4/1993 | Yamada et al. .......... 360/99.06 |
| 5,457,677 A | * | 10/1995 | Yamashita et al. ........... 369/289 |
| 5,870,376 A | * | 2/1999 | Miyazaki et al. ............ 369/291 |
| 6,031,811 A | * | 2/2000 | Umesaki et al. ............ 369/192 |

* cited by examiner

*Primary Examiner*—David L. Ometz
(74) *Attorney, Agent, or Firm*—Arent Fox Kintner Plotkin Kahn

(57) ABSTRACT

A main chassis is provided to mount a system for reproducing a large diameter disc and a small diameter disc, a pair of disc carrying rollers is mounted on the main chassis for carrying an inserted disc to the system, and a large diameter disc detector arm is provided to be pivoted by a large diameter disc carried by the disc carrying rollers so that the large diameter disc is clamped. An adapter is detachably mounted on the main chassis. A pair of centering arms are mounted on the adapter for centering a small diameter disc carried by the disc carrying rollers, and a small diameter disc detector arm mounted on the adapter for operating the large diameter disc detector arm for clamping the carried small diameter disc.

13 Claims, 4 Drawing Sheets

DEVICE FOR REPRODUCING OPTICAL DISCS

This application is a continuation-in-part of application Ser. No. 09/472,836, filed Dec. 28, 1999, now abandoned.

BACKGROUND OF THE INVENTION

The present invention relates to a device for reproducing optical discs such as CD (compact disc), and more particularly to an optical disc reproducing device corresponding to CDs having different diameter.

In general, CD as an optical information recorded medium has a diameter of 12 cm and a thickness of 1.2 mm. A method in which an information of CD is reproduced from an inner side to an outer side has been adopted.

There is provided two kinds of the CDs which are different in diameter. One of the CDs has a diameter of 12 cm (hereinafter 12CD), and the other CD has a diameter of 8cm (hereinafter 8CD). Therefore, a CD reproducing device for reproducing both kinds of discs has been recently provided.

One example of such a CD reproducing device (hereinafter CD device) corresponding to discs having different diameters is as follows. First, a user inserts a 8 CD or a 12Cd from an opening for inserting mounted on a device body into the device. The CD is automatically transferred to the inside of the device by a CD carrying mechanism. Next, it is detected whether each CD having a different diameter is securely located in a predetermined storing position by a 12CD detector or an 8CD detector which is activated when a periphery of the carried discs abut on them.

Furthermore, the CD is transferred to a turn table after it is detected that it is securely located in the predetermined storing position by either the 12CD detector or the 8CD detector. Then, after transferred to the turn table, the CD is clamped from an upper side thereof by a clamper mechanism, and rotated by a mechanism for rotating the turn table. An information recorded on the CD can be reproduced by an optical pickup mechanism for reproducing information as recorded.

By the way, the 12CD detector and 8CD detector are independently provided on the reproducing device. They are operated through abutting on an outer periphery end of the CD as carried so that a mechanical on-off operation of the CD carrying mechanism and the clamping mechanism or the like can be carried out.

Consequently, the reproducing device for discs having different diameters is complicated in construction since each different type of detector is needed. Further, the manufacturing cost increases because of the increase of the number of parts and manufacturing steps.

On the other hand, there are areas in which the 8cm CD is not used. In order to supply the reproducing device to such a particular area, a conventional reproducing device for the 12CD only must be manufactured. It is, however, uneconomical on a manufacturing efficiency to manufacture both the 12/8CD common device and the 12CD exclusive device.

Further, it may be considered that we stop the supply of the conventional 12CD device to such an area, and provide the 12/8CD common device on the other hand. However, if do so, parts of 8CD detector are extremely wasteful so that a manufacturing cost may increase unnecessarily.

In addition, it is difficult to manufacture the 12CD device on the manufacturing line for the 12/8CD common device without assembling the parts for the 8CD device since the manufacturing step becomes complicated.

SUMMARY OF THE INVENTION

An object of the present invention is to provide different-diameter-discs reproducing device which may be simplified in construction, and easily changed to a 12 cm disc reproducing device.

According to the present invention, a device for reproducing optical discs which are different in diameter, comprises a main chassis mounting a system for reproducing a large diameter disc and a small diameter disc, in which the system having a pickup, a turntable and a clamper for clamping a disc on the turntable, disc carrying rollers for carrying an inserted disc to the system, a large diameter disc detector arm which is pivoted by a large diameter disc carried by the disc carrying rollers so that the clamper is operated by the large diameter disc detector arm, an adapter detachably mounted on the main chassis, centering means mounted on the adapter for centering a small diameter disc carried by the disc carrying rollers, actuating means mounted on the adapter for operating the large diameter disc detector arm for clamping the carried small diameter disc.

The centering means comprises a pair of centering arms pivotally mounted on the adapter, and the actuator means comprises a small diameter disc detector arm operated by one of the centering arms.

Each of the centering arms has a centering pin engaged with the carried disc so that the centering arm is pivoted.

The small diameter disc detector arm is operatively connected to the large diameter disc detector arm.

DETAILED DESCRIPTION OF THE PREFERRED EMBODIMENT

The system of the present invention will be described with reference to drawings.

Figure 1:
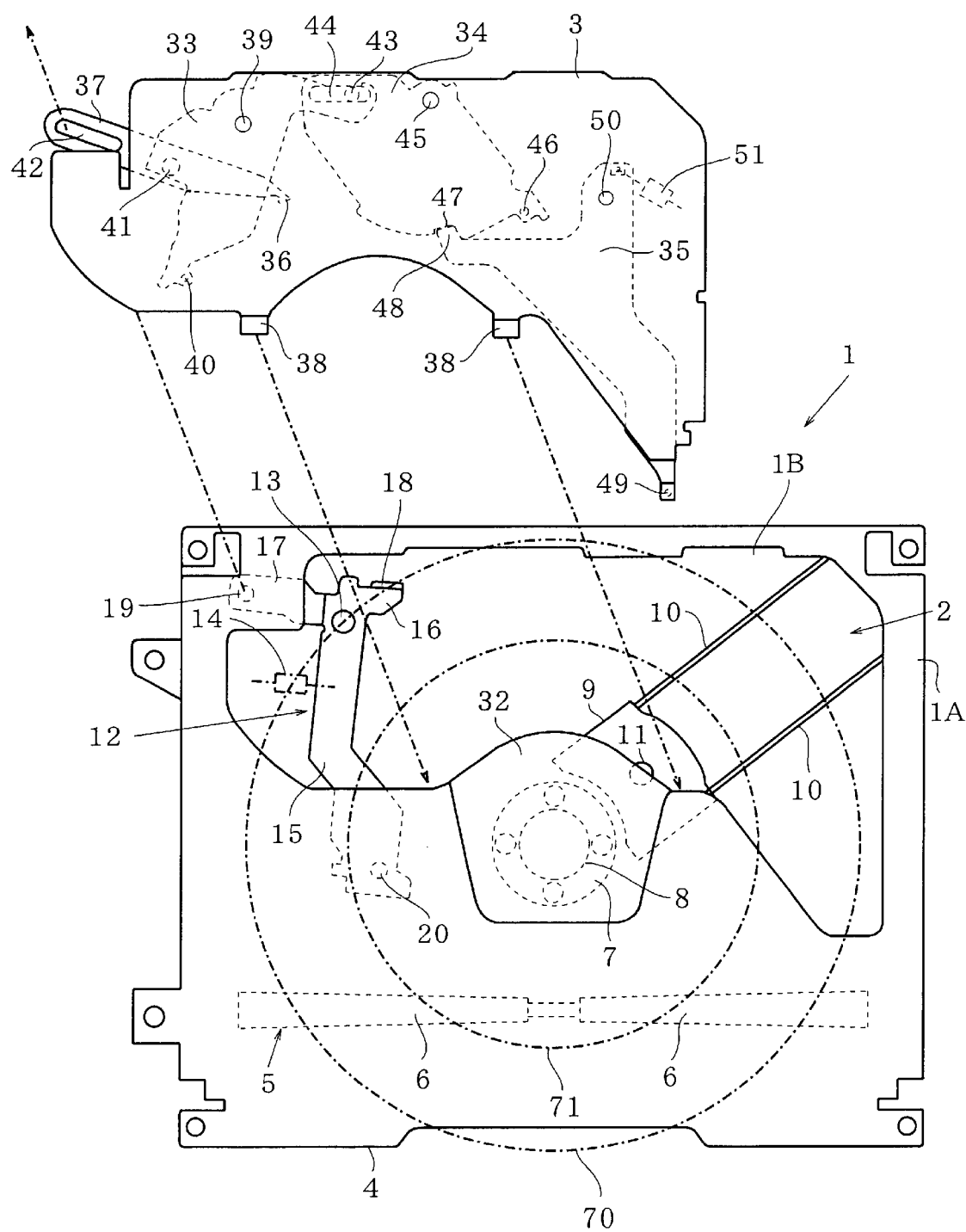
FIG. 1 is a plan view of a main chassis of a different-diameter-discs reproducing device of the present invention.
Figure 2:
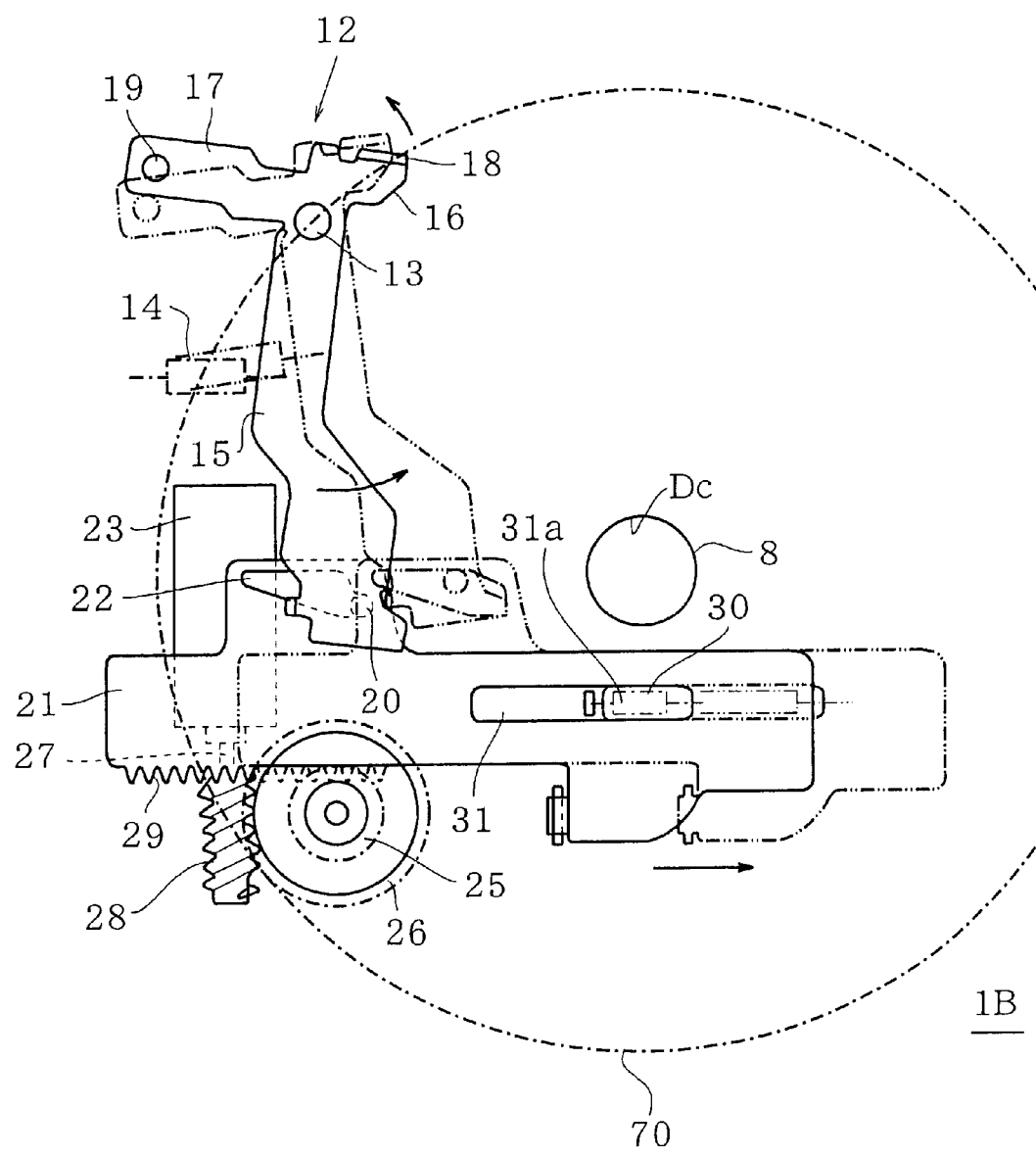
FIG. 2 is a plan view of the device which is changed to a 12CD exclusive reproducing device.
Figure 3:
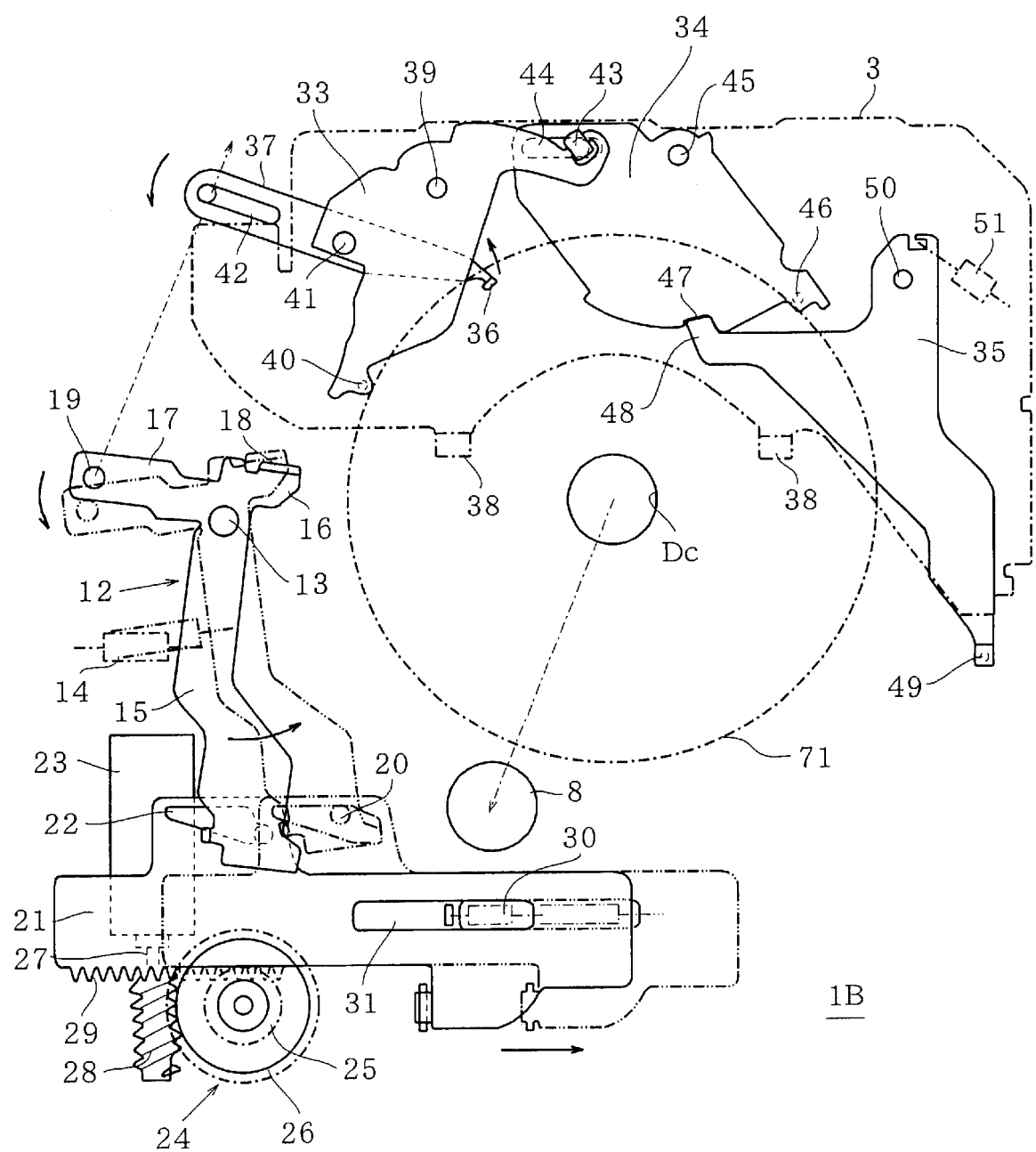
FIG. 3 is a plan view of the different-diameter-discs reproducing device when the 8CD is reproduced.
Figure 4:
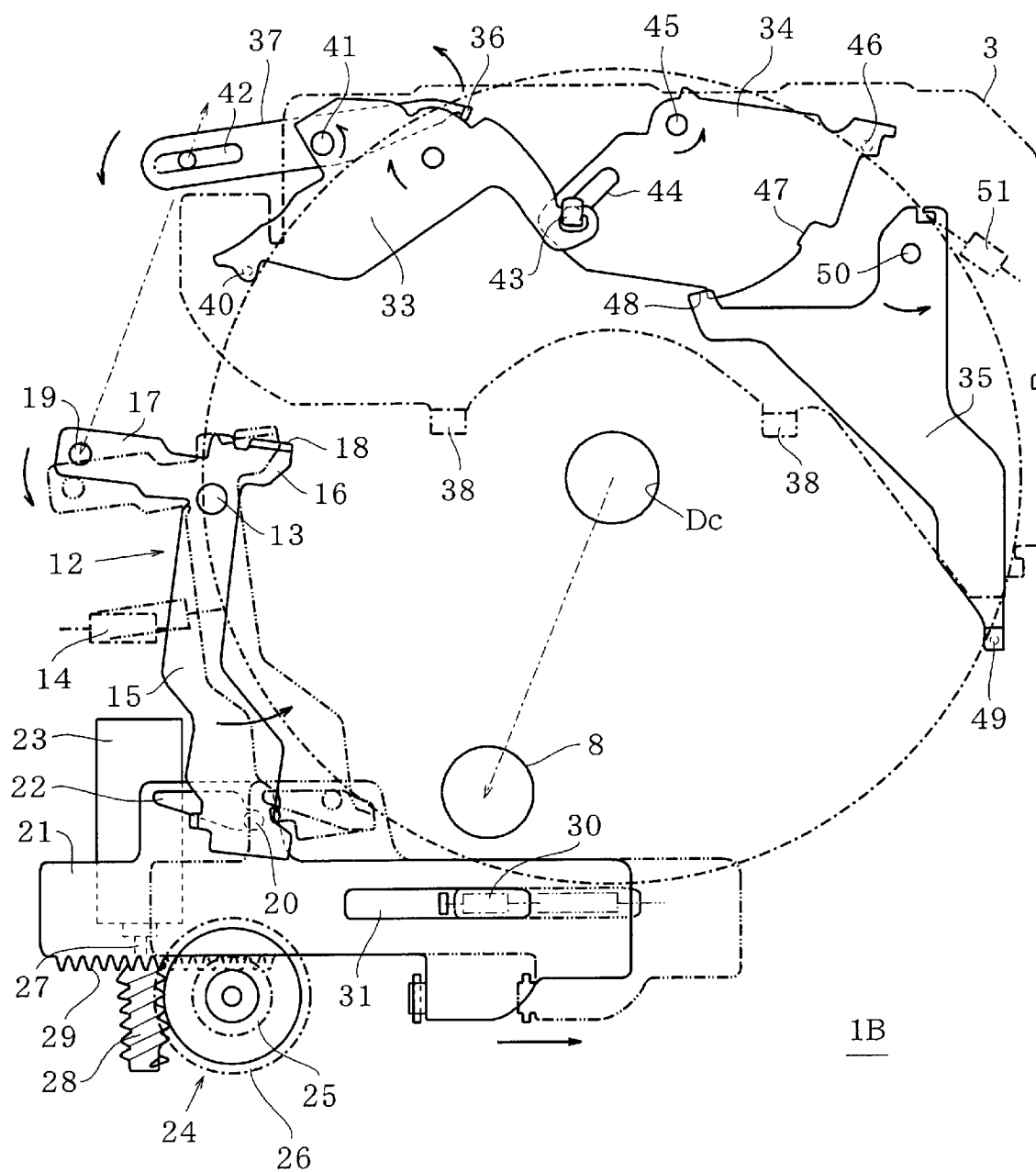
FIG. 4 is a plan view of the different-diameter-discs reproducing device when the 12CD is reproduced.

FIG. 1 is a plan view showing a main chassis of a different-diameter-discs reproducing device in which the present invention is applied, FIG. 2 is a plan view showing the main chassis of the reproducing device proper to 12CD, and FIGS. 3 and 4 are plan views showing the main chassis for 12/8CD common device.

Referring to FIG. 1, an engaging hole 2 is formed in an upper plate 1A of a main chassis 1 of the different-diameter-discs reproducing device according to the present invention. The main chassis 1 is a main part of the device and has a substantially rectangular shape. In the hole 2, an 8/12CD compatible arm bracket 3 as an adapter is removably mounted. Moreover, the detail of the 8/12CD compatible arm bracket 3 will be explained hereinafter.

In a front wall (not shown) of the main chassis 1, a disc inserting opening 4 is formed, extending in a lateral direction (right and left direction) in the drawing. An 8CD or a 12CD can be inserted into the main chassis 1 or ejected from the opening 4. On a lower plate 1B of the main chassis 1, a disc carrying roller 5, which has a substantially cylindrical shape and carries the CD through sliding along an underside surface thereof, is mounted with both ends rotatably supported adjacent to the opening 4, and a photosensor (not shown) is provided for detecting the insertion of the CD. When the photosensor detects the insertion of the CD, a driving motor (not shown) for driving the disc carrying roller 5 is operated so as to insert the CD. Moreover, the driving motor can be rotated in an opposite direction when the CD is ejected.

The disc carrying roller 5 is disposed so that a direction of a rotational shaft thereof is parallel with the opening 4, and the former is vertical with a direction of carrying the CD each other. The disc carrying roller 5 is provided with a pair of driving surfaces 6, which slides along the underside surface of the CD, being made of rubber having a large frictional resistance. Each of the driving surfaces 6 is tapered toward the center of the roller 5.

Namely, the CD inserted from the opening 4 is mounted on the roller 5. When the photosensor detects the insertion of the CD, the roller 5 is rotatable by the motor to carry the CD into the main chassis. Since the driving surfaces are tapered, the disc is gradually shifted to the center even if the disc is deflected from the center. When the disc is carried to a position above a turntable 7, the roller 5 is lowered so that it becomes detached from the underside surface of the CD. Also, when ejecting the CD after reproducing, the roller 5 is again raised so as to become slidable with the underside surface of the CD.

In a central portion of the lower plate 1B of the main chassis 1, the turntable 7 for centering and rotating the carried disc is provided. The turntable has a cylindrical projection 8 on a CD attaching surface, and a central hole of the disc engages therewith when the roller 5 is lowered, thereby centering the disc.

Also, the turntable 7 is rotated by a spindle motor (not shown) disposed under it.

A pickup 9 having a lens 11 is slidably mounted on a pair of parallel guide shafts 10 supported on the lower plate 1B and moved in the radial direction of the CD.

On a rear portion of the lower plate 1B, a 12CD detector arm 12 as the first detector is pivotally on a supporting shaft 13, i.e. rotatably in a horizontal plane, mounted for detecting the centering of the 12CD. The detector arm 12 is urged in the clockwise direction by a coil spring 14 the other end of which is secured to the lower plate 1B.

The detector arm 12 comprises a base plate 15, a projection 16 formed at an base end portion of the base plate 15, and a projection 17 opposite to the projection 16. The base plate 15 extends in the disc carrying direction.

A 12CD detecting projection 18 is upwardly projected from a side of the projection 16 so as to contact with the periphery of the carried 12CD. On the other hand, a pin 19 is upwardly projected on the projection 17, which is opposed to the projection 16 in respect of the base plate 15, that is, extended to the rear left side of the base plate 15, so as to be engaged with an elongated hole 42 of an 8CD detector arm 37 which will be described hereinafter.

Furthermore, an engaging pin 20 is downwardly projected from a tip end portion of the base plate 15. Referring to FIG. 2, the engaging pin 20 engages with a hole 22 formed in a mode changeover lever 21 to urge the lever toward the right in the drawing. The detector arm 12 and the mode changeover lever 21 are disposed under the CD loaded on the turntable 7.

The mode changeover lever 21, which is slidable in the right and left directions, is mounted on the lower plate 1B, and has a cam shape (not shown) to change over each mode such as the clamping of CD. Namely, the detector arm 12 rotates around the shaft 13 so that the mode changeover lever 21 cab be slidably moved in order to operate a clamper 32 or the like.

On the lower plate 1B under the mode changeover lever 21, a driving motor 23 is disposed for sliding the mode changeover lever 21. The driving motor 23 slides the mode changeover lever 21 through driving gears 24 having two different diameter gears.

The driving gears 24 comprise a pinion 25 with a small diameter and a worm wheel 26 with a large diameter, which are set under the same shaft. The worm wheel 26 engages with a worm 28 mounted on a tip portion of a rotating shaft 27 of the motor 23. The motor 23 is operated at the same time as the rotation of the roller 5 when the photosensor detects the insertion of CD.

The pinion 25 is engageable with a rack 29, having a predetermined length, provided along a left end front side of the mode changeover lever 21.

Further, one end side of a coil spring 30 is connected to one end of an elongate hole 31 provided around a central portion of the mode changeover lever 21, and another end of the spring 30 is engaged with the lower plate 1B. The mode change over lever 21 is urged to the left by the spring 30 so that the rack 29 is disengaged from the pinion 25 under a normal situation.

When the photosensor detects the insertion of the CD through the opening 4, the roller 5 and the motor 23 starts operating at the same time. After that, a periphery of the carried CD abuts on the detector arm 12, and then the detector arm 12 is rotated in the counterclockwise direction. Thereby, the engaging pin 20 of the detector arm 12 slides along the hole 22 of the mode changover lever 12 so as to allow the lever 12 to slide to the right direction in the drawing. The sliding movement of the lever 12 allows the rack 29 to engage with the pinion 25 of the driving gears 24.

In this state, the driving gears 24 starts rotating together with the rotation of the motor 23. Since the pinion 25 engages with the rack 29, a driving force of the motor 23 is transmitted to the rack 29 of the mode changeover lever 21 through the driving gears 24. Thereby, when the mode changeover lever 21 is slid to the right direction, the clamping operation of CD or the like is carried out.

Further, referring to FIG. 1, a clamper 32 is provided above the turntable 7 for clamping the CD mounted on the turntable by way of attaching with a central hole Dc of the CD. The clamper 32 is pivotally supported on the upper plate 1A at a front end portion thereof, and on the other hand, has a free end at a rear end portion.

When the CD is carried onto the turntable 7, and further the mode changeover lever 21 is slid, a clamping mechanism (not shown) for operating the clamper 32 is activated, so that the rear end portion of the clamper 32 is moved in the direction for clamping the CD.

On the underside of the arm bracket 3, a centering arm L33, a centering arm R34 and a centering lock arm 35 are pivotally supported, respectively.

The hereinbefore described 8CD detector arm 37 as the second detector has an 8CD detecting portion 36 for detecting the centering of 8CD and is rotatably supported on the underside of the centering arm L33 by a shaft 41. These arms and members are positioned above the CD mounted on the turntable.

The 8CD detecting portion 36 of the 8CD detector arm 37 is adapted to be retired by the centering arms 33 and 34 to a position where the 8CD detecting portion 36 does not detect the 12CD when the 12CD is inserted.

On front end portions of the arm bracket 3, a pair of engaging bosses 38 are formed which engage with the upper plate 1A of the chassis 1.

The centering arm L33, which is on the central left end of the underside of the arm bracket 3 and having a shape of a plane plate, is rotatably supported by a shaft 39, and a centering pin 40 is downwardly projected at the front end of the arm L33 so as to be engaged with the periphery of the 12CD and the 8CD.

By the way, the 8CD detector arm 37 is rotatably mounted on the left side end of underside of the arm L33 by the shaft 41, and the 8CD detecting portion 36 is downwardly projected on the right end side of the 8CD detector arm 37 so as to abut on each periphery of the 8CD and the 12CD. Further, on the left end side, the elongated hole 42 which the projecting pin 19 of the 12Cd detector arm 12 is engaged with is provided.

An engaging pin 43 is downwardly projected on the rear end side of the arm L33, and the pin 43 is engaged in an elongated hole 44 of the centering arm R34, which is rotatably mounted around the central rear portion of the underside of the arm bracket 3 by a shaft 45 and is an operating member with a sector shape. The engaging pin 43 of the arm L33 is slidably engaged with the elongated hole 44 provided in the left end side of the arm R34. On the right end portion of the arm R34, the centering pin 46 is downwardly projected from the arm R34 so as to be engaged with the periphery of the 12CD and the 8CD. An engaging groove 47 with a cutout shape is formed on the front end portion of the arm R34.

A centering lock arm 35 is rotatably supported by a shaft 50 at the right end portion of the underside of the arm bracket 3. An engaging portion 48 is formed on the left end side of the centering lock arm 35 so as to be engageable with the engaging groove 47. A centering pin 49 is downwardly projected from a front end portion thereof to contact with a periphery of the 12CD only. A spring 51 is provided for urging the lock arm 35 in the clockwise direction to engage an engaging portion 48 with the groove 47, thereby to lock the arm R34.

Also, the plurality of photosensors (not shown) for sensing the movement of the CD are disposed on a predetermined portions of the lower plate 1B. These photosensors discriminate whether the CD inserted from the opening 4 is 8CD or 12CD.

A 12CD exclusive reproducing device as manufactured on the manufacturing line for the 12/8 CD common device of the present invention will be described hereinafter with reference to FIG. 2. In the system of FIG. 2, the detector arm 12 is mounted on the lower plate 1B, but the arm bracket 3 is not mounted in the engaging hole 2 of the upper plate 1A.

When a 12CD 70 is inserted in the opening 4 of the main chassis 1 (see FIG. 1) by the user, the insertion is detected by the photosensors (not shown), and then the disc carrying rollers 5 (see FIG. 1) and the motor 23 are driven, thereby carrying the 12CD 70 into the device.

It is detected by a plurality of photosensors whether the diameter of the inserted disc is 12 cm or not. If the 12CD 70 is detected, the disc is further carried. If an 8CD 71 (see FIG. 1) is detected, the disc carrying rollers 5 are reversely rotated, so that the 8CD 71 is ejected.

The carried 12CD is transferred until the central hole Dc thereof is engaged with a guide projection 8 of the turntable 7. When the periphery of the 12CD 70 contacts with the detecting projection 18 mounted on the projection 16 of the 12CD detector arm 12, the detector arm 12 is rotated in the counterclockwise direction against the resilient force of the spring 14. Consequently, the pin 20 on the detector arm 12 pushes the mode changeover lever 21 to the right against the spring 30, contacting with end portions of the hole 22 mounted on the mode changeover lever 21. At that time the central hole Dc of the 12CD 70 engages with the projection 8 of the turntable 7 (see FIGS. 1, 2).

On the other hand, by the movement of the mode changeover lever 21 to the right, the rack 29 of the lever 21 engages with the pinion 25 which is rotated by the motor 23 through the worm 28 and the worm wheel 26, so that the mode changeover lever 21 is moved in further right direction. Thereby, the rack 29 of the lever 21 actuates the clamper 32 (see FIG. 1) to clamp the 12CD 70. Thereafter, the disc carrying rollers 5 are retired, and the pickup 9 is operated to reproduce the 12CD 70.

Hereinafter, described is the operation wherein the 8CD 71 is inserted into the different-diameter-discs reproducing device.

As shown in FIG. 3, whereas the detector arm 12 is attached to the lower plate 1B, the arm bracket 3 as an adapter is attached to the engaging hole 2 of the upper plate 1A of the main chassis 1. When attached, the pin 19 of the 12CD detector arm 12 is engaged with the hole 42 of the 8CD detector arm 37.

When the 8CD 71 is inserted in the opening 4 of the main chassis 1 by the user, the photosensor detects the insertion, and the disc carrying rollers 5 and the motor 23 are operated to carry the 8CD 71 into the device. When the 8CD 71 reaches to the position where the central hole Dc of the 8CD engages with the guiding projection 8 of the turntable 7, the periphery of the 8CD contacts with the centering pin 46 of the centering arm R34 which is locked by the lock arm 35, and with the centering pin 40 of the centering arm L33 which is locked by the centering arm R34. Thus, the 8CD 71 is exactly centered.

Furthermore, the periphery of the 8CD 71 contacts also with the 8CD detecting portion 36 of the 8CD detector arm 37, so that the 8CD detector arm 37 and the 12CD detector arm 12 are rotated in the counterclockwise direction, respectively. The rotation of the arm 12 is caused since the pin 19 of the detector arm 12 is rotated along the hole 42 of the rotated 8CD detector arm 37. Consequently, the pin 20 on the detector arm 12 pushes the mode changeover lever 21 to the right against the spring 30 through contacting with the end of the hole 22. By the movement of the mode changeover lever 21 to the right, the rack 29 of the lever 21 engages with the pinion 25 which is rotated by the motor 23 through the worm 28 and the worm wheel 26, so that the driving force of the motor 23 is transmitted from the pinion 25 through the driving gears 24 to the rack 29 of the mode changeover lever 21 to move the mode changeover lever 21 in the further right direction. And thus, the shape of rack of the lever 21 actuates the clamper 32 (see FIG. 1) to clamp the 8CD 71. Thereafter, the disc carrying rollers 5 are retired, and the pickup 9 is operated to reproduce the 8CD 71.

Hereinafter, described is the operation wherein the 12CD 70 is inserted into the different-diameter-discs reproducing device.

As shown in FIG. 4, the 12CD detector arm 12 as the first detecting member is mounted on the lower plate 1B of the main chassis 1, and the arm bracket 3 is attached to the engaging hole 2 of the upper plate 1A. In addition, the projecting pin 19 of the detector arm 12 is inserted into the hole 42 of the 8CD detector arm 37.

When the 12CD 70 is inserted in the opening 4 of the main chassis 1 by the user, the photosensor detects the insertion, and the disc carrying rollers 5 and the motor 23 are operated to carry the 12CD 70 into the device.

The periphery of the 12CD 70 engages with the centering pin 49 of the lock arm 35 firstly. The centering pin 49 is gradually pressed to the right direction in the drawing by the periphery of the carried 12CD. Accordingly, the lock arm 35 is rotated in the counterclockwise direction about the shaft 50, so that the engaging portion 48 of the lock arm 35 disengages from the groove 47 of the arm R34 to release the arm R34, thereby also releasing the arm L33.

In such a condition, the periphery of the carried 12CD 70 engages with the centering pin 40 of the arm L33 and with the centering pin 46 of the arm R34, so that the centering pins 40 and 46 are further pressed by the periphery of the 12CD since the 12CD is further carried by the disc carrying rollers 5. Thereby, the arm L33 is rotated in the clockwise direction about the shaft 39, and the arm R34 is rotated in the counterclockwise direction about the shaft 45.

The 8CD detector arm 37 rotatably mounted on the arm L33 is moved backward together with the arm L33, and is rotated in the counterclockwise direction about the shaft 41 since the detecting portion 36 is pushed by the periphery of the 12CD 70.

When the 12CD 70 is transferred by the disc carrying rollers 5 to the position where a central hole Dc thereof engages with the projection 8 of the turntable 7, and the periphery of the 12CD 70 engages with the detecting projection 18 of the detector arm 12, the arm 12 is rotated in the counterclockwise direction. In addition, the projecting pin 19 of the detector arm 12 is moved with sliding along the hole 42 of the rotated 8CD detector arm 37. Thus, the 8CD detector arm 37 is further moved by the pin 19 of the rotated arm 12 to a position where the 8CD detector arm 37 does not contact with the 12CD 70, i.e. outside from the centering position of the 12CD to be retired.

On the other hand, the pin 20 on the detector arm 12 pushes the mode changeover lever 21 to the right direction against the spring 30 through contacting with the end of the hole 22 of the mode changeover lever 21.

By the movement of the mode changeover lever 21 to the right, the rack 29 of the lever 21 engages with the pinion 25 which is rotated by the motor 23 through the worm 28 and the worm wheel 26, so that the lever 21 is further moved to the right and actuates the clamper 32 (see FIG. 1) to clamp the 12CD 70. Thereafter, the disc carrying rollers 5 are retired, and the pickup 9 is operated to reproduce the 12CD 70.

In accordance with the present invention, the different-diameter-discs reproducing device is simplified in construction, and can be easily converted to the 12 cm disc exclusive reproducing device only by removing the arm bracket as the adapter from the chassis.

While the invention has been described in conjunction with preferred specific embodiment thereof, it will be understood that this description is intended to illustrate and not limit the scope of the invention, which is defined by the following claims.

What is claimed is:

1. A device for reproducing optical discs which are different in diameter, comprising:
    a main chassis mounting a system for reproducing a large diameter disc and a small diameter disc, the system having a pickup, a turntable and a damper for clamping either one of said discs on the turntable;
    disc carrying rollers for carrying an inserted disc to the system;
    a large diameter disc detector arm which is pivoted by said large diameter disc carried by the disc carrying rollers so that the damper is operated by the large diameter disc detector arm;
    an adapter detachably mounted on the main chassis;
    centering means mounted on the adapter for centering said small diameter disc carried by the disc carrying rollers;
    actuating means mounted on the adapter for operating the large diameter disc detector arm for clamping the carried small diameter disc.

2. The device according to claim 1 wherein the centering means comprises a pair of centering arms pivotally mounted on the adapter.

3. The device according to claim 2 wherein the actuating means comprises a small diameter disc detector arm operated by one of the centering arms.

4. The device according to claim 3 wherein the centering arms are operatively connected with each other.

5. The device according to claim 4 further comprising a lock arm mounted on the adapter for locking the centering arms at a position where the centering arms center the carried small diameter disc.

6. The device according to claim 5 wherein the lock arm has a pin which is engaged with a periphery of the carried diameter disc so as to be rotated so that the centering arms and the small diameter disc detector arm are released.

7. The device according to claim 3 wherein the small diameter disc detector arm is operatively connected to the large diameter disc detector arm.

8. The device according to claim 2 wherein each of the centering arms has a centering pin engaged with the carried disc so that the centering arm is pivoted.

9. A device for reproducing optical discs which are different in diameter, comprising:
    a damper for clamping said discs;
    a first detector for detecting centering of a large diameter disc; and
    an adapter detachably mounted on said device;
    wherein
        said adapter has a second detector for detecting centering of a small diameter disc and a retiring mechanism for retiring said second detector to a position where said large diameter disc is not detected when said large diameter disc is inserted.

10. The device according to claim 9 wherein said large diameter disc only can be reproduced when said adapter is not attached with said device, and also both said large diameter disc and said small diameter disc can be alternatively reproduced when said adapter is attached with said device.

11. The device according to claim 9 wherein said first detector is disposed on one side of said disc, and said second detector and said lamper are disposed on another side of said disc.

12. The device according to claim 9 further comprising:
    a projecting portion mounted on said first detector; and
    an engaging portion mounted on said second detector so as to be engaged with said projecting portion;
    wherein
        said first detector and said second detector are connected with each other through an engagement between said projecting portion and said engaging portion when said adapter is attached with said device.

13. The device according to claim 9, wherein the device has a reproducing unit for reproducing the large diameter disc and the small diameter disc, and the adapter does not have the reproducing unit.

* * * * *

UNITED STATES PATENT AND TRADEMARK OFFICE
CERTIFICATE OF CORRECTION

PATENT NO. : 6,469,971 B1
DATED : October 22, 2002
INVENTOR(S) : Sato et al.

It is certified that error appears in the above-identified patent and that said Letters Patent is hereby corrected as shown below:

<u>Title page,</u>
Please correct the following:

Item [73], Assignees, delete "Toboku" and insert -- Tohoku -- Pioneer Corporation

Signed and Sealed this

Tenth Day of June, 2003

JAMES E. ROGAN
*Director of the United States Patent and Trademark Office*